United States Patent [19]

Doi et al.

[11] Patent Number: 5,065,869
[45] Date of Patent: Nov. 19, 1991

[54] ELECTRONICALLY CONTROLLABLE VIBRATION DAMPING DEVICE

[75] Inventors: Kazuhiro Doi, Yokohama; Yasuhiko Fujiwara, Kanagawa; Toshiro Abe, Mitaka; Shinichi Matsui, Yokosuka, all of Japan

[73] Assignee: Nissan Motor Co., Ltd., Yokohama, Japan

[21] Appl. No.: 221,570

[22] Filed: Jul. 20, 1988

[30] Foreign Application Priority Data

Jul. 20, 1987 [JP] Japan ................... 62-180728

[51] Int. Cl.[5] ................ F16F 9/00; F16F 15/02
[52] U.S. Cl. ................ 207/140.1; 207/219
[58] Field of Search ............ 267/140.1, 219, 35, 267/140.1 E, 140.1 AE; 248/550, 562, 636; 137/807, 827

[56] References Cited

U.S. PATENT DOCUMENTS

| 2,720,087 | 1/1988 | Duclos et al. ............ 267/140.1 |
| 3,599,428 | 8/1971 | Chaney et al. ............ 137/827 X |
| 4,613,118 | 9/1986 | Morita ............ 267/140.1 |
| 4,660,813 | 4/1987 | Reuter ............ 267/140.1 |
| 4,671,227 | 6/1987 | Hollerweger et al. ............ 267/140.1 |
| 4,742,998 | 5/1988 | Schubert ............ 267/140.1 |
| 4,757,981 | 7/1988 | Härtel ............ 267/140.1 |
| 4,773,632 | 9/1988 | Härtel ............ 267/219 X |

FOREIGN PATENT DOCUMENTS

| 0068395 | 1/1983 | European Pat. Off. . |
| 0257932 | 3/1988 | European Pat. Off. . |
| 3433797A1 | 3/1986 | Fed. Rep. of Germany . |
| 3731024A1 | 3/1988 | Fed. Rep. of Germany . |
| 59-231239 | 12/1984 | Japan . |
| 60-104828 | 10/1985 | Japan . |
| 2163104A | 2/1986 | United Kingdom . |

*Primary Examiner*—Matthew G. Graham
*Attorney, Agent, or Firm*—Foley & Lardner

[57] ABSTRACT

A vibration damping device includes first and second accelerometers which are used to determine the relative displacement between a body and a base between which the device is operatively connected. The output of one of the accelerometers is also monitored in a manner to determine the frequency of the vibration. This data is processed in a manner to ascertain the timing when the phases of a vertical spring input (produced by the compression of an elastomeric member which defines the main spring of the damper) and an expansion spring input (produced the displacement of rheopetic fluid between first and second variable volume chamber and the associated expansion characteristics of the members defining the same) are reversed. Using this data and the vibration frequency data the timing with which a voltage should be applied to electrodes disposed in an orifice interposed between the first and second chambers to increase the viscosity of the rheopetic fluid and increase the flow resistance of the orifice. The device further includes a perforate suspended mass which is tuned in a manner to act as a dynamic damper.

12 Claims, 5 Drawing Sheets

ELECTRONICALLY CONTROLLABLE VIBRATION DAMPING DEVICE

BACKGROUND OF THE INVENTION

1. Field of the Invention

The present invention relates to damping devices such as those including fluid filled elastomeric members and the like and more specifically to an improved arrangement which permits the damping characteristics to be controlled by sensing the parameters which vary with the vibration and producing a suitable control signal which can be applied to the member.

2. Description of the Prior Art

JP-A-60-104828 discloses an arrangement wherein an damper is comprised of an annular rigid member on which a main elastomeric body and a flexible elastomeric diaphram are supported in a manner an enclosed space which is filled with a suitable working fluid which exhibits rheopectic properties. A partition member is disposed within the space to define first and second chambers. The partition is arranged to define an elongated rectangular cross-sectional communiction passage therein. The partition includes electrodes which are disposed in the communication passage in a juxtaposed manner. These electrodes are connected with a control circuit which selectively applies a voltage thereacross.

FIG. 1 is a model which depicts the arrangement of a device disclosed in JP-A-60-104828 as a system having a single degree of freedom. In this model Fk denotes the applied vibration induced spring force which causes displacement while Fc denotes the damping force produced. Ftotal denotes the vibrational force which is transmitted through the device. As shown in FIG. 2, when Fk and Fc are in phase, the damping force is attenuated, and when the two are out of phase or in what shall be referred to as a reversed phase condition, the damping force is amplified.

In this arrangement the fluid which is sealed in the elastomeric arrangement is arranged to flow through the orifice in a manner wherein the fluid within the orifice passage arrangement acts a mass, and the accompanying fluid flow induces an expansion of the elastomeric body in a manner to define a spring effect. While the vibration frequency remains just below that at which resonance occurs the dynamic spring constant of the arrangement is effectively lowered and a dynamic damping effect is produced.

However, in actual fact this device cannot be represented by a system having only a single degree of freedom in that the compressive spring component and the expansive spring component tend to develop a phase difference which varies between 0 and 18 degrees and as a result adequate attenuation of vibration transmission cannot be achieved under a wide range of operating conditions.

SUMMARY OF THE INVENTION

It is an object of the present invention to provide a damping arrangement which is effective over a wide range of operating conditions which include resonance frequencies.

In brief, the above object is achieved by an arrangement wherein first and second accelerometers which are used to determine the relative displacement between a body and a base between which the damping device is operatively connected. The output of one of the accelerometers is also monitored in a manner to determine the frequency of the vibration. This data is processed in a manner to ascertain the timing when the phases of a vertical spring input (produced by the compression of an elastomeric member which defines the main spring of the damper) and an expansion spring input (produced the displacement of rheopetic fluid between first and second variable volume chamber and the associated expansion characteristics of the members defining the same) are reversed. Using this data and the vibration frequency data the timing with which a voltage should be applied to electrodes disposed in an orifice interposed between the first and second chambers to increase the viscosity of the rheopetic fluid and increase the flow resistance of the orifice. The device further includes a perforate suspended mass which is tuned in a manner to act as a dynamic damper.

More specficially a first aspect of the present invention is deemed to comprise: a device which is interposed between a vibrating body and a base, the device featuring: means defining a spring, the spring being operatively interconnected between the body and the base, the spring undergoing distortion when the body moves relative to the base; means defining first and second variable volume chambers, the first and second chambers being filled with a fluid which exhibits rheopectic properties, the chamber defining means being operatively connected between the body and the base in a manner wherein displacement of the body with respect to the base induces fluid to be displaced between the first and second chambers; an orifice operatively interposed between the first and second fluid chambers; first and second electrodes defined in the orifice, the first and second electrodes being arranged to define a multi-passage arrangement in the orifice in a manner wherein when a voltage is applied to the first and second electrodes, the viscosity of the rheopetic fluid between the electrodes increases and the restriction to fluid flow through the orifice increases; means for detecting the relative displacement between the body and the base; means for detecting the frequency of the vibration being applied to the device; a control circuit which is responsive to the relative displacement detecting means and the frequency detecting means and which utilizes the detected relative displacement to develop a vertical spring input power value and which utilizes the detected relative displacement and the detected frequency to calculate an expansive spring input force value and the timing in which the phase of the vertical spring input force and the expansive spring input force are reversed, the control circiut being arranged to determine the timing with which a voltage should be applied to the first and second electrodes.

A second aspect of the present invention is deemed to comprise a device which is interposed between a vibrating body and a base, the device featuring: means defining a spring, the spring being operatively interconnected between the body and the base, the spring undergoing distortion when the body moves relative to the base; means defining first and second variable volume chambers, the first and second chambers being filled with a fluid which exhibits rheopectic properties, the chamber defining means being operatively connected between the body and the base in a manner wherein displacement of the body with respect to the base induces fluid to be displaced between the first and second chambers; an orifice operatively interposed between the first and second fluid chambers; first and second electrodes defined in the orifice, the first and second electrodes being arranged to define a multi-passage arrangement in the orifice in a manner wherein when a voltage is applied to the first and second electrodes, the viscousity of the rheopetic fluid between the electrodes increases and the restriction to fluid flow through the orifice increases; a first sensor, the first sensor being disposed in a manner to be responsive to a first parameter which varies with the vibration of the body; a second sensor, the second sensor being disposed in a manner to be responsive to a second parameter which varies with the vibration of the base; a control circuit operatively connected with the first and second sensors, the control circuit being arranged to process the inputs from the first and second sensors in a manner which derives the relative displacement between the body and the base and which derives the frequency of the vibration applied to the device, the control circuit being further arranged to utilize the derived relative displacement to develop a vertical spring input power value and utilize the detected relative displacement and the detected frequency to calculate an expansive spring input force value and the timing in which the phase of the vertical spring input force and the expansive spring input force are reversed, the control circuit being arranged to determine the timing with which a voltage should be applied to the first and second electrodes.

A further aspect of the instant invention comprises the above mentioned arrangements further including a vibratable mass; and a springy member supporting the mass, the mass and the springy member defining a dynamic damping arrangement which can be excited to vibrate.

DETAILED DESCRIPTION OF THE PREFERRED EMBODIMENT

Figure 1:
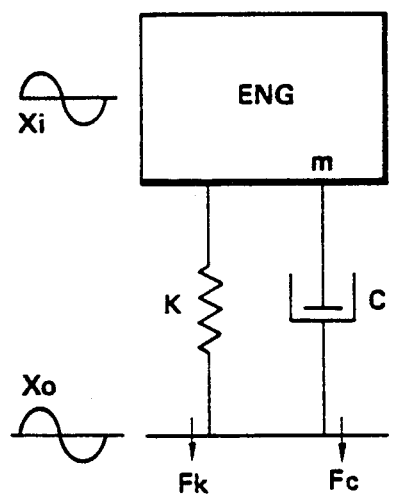
FIG. 1 is a model showing the arrangement of the prior art device discussed in the opening paragraphs of the instant disclosure.
Figure 2:
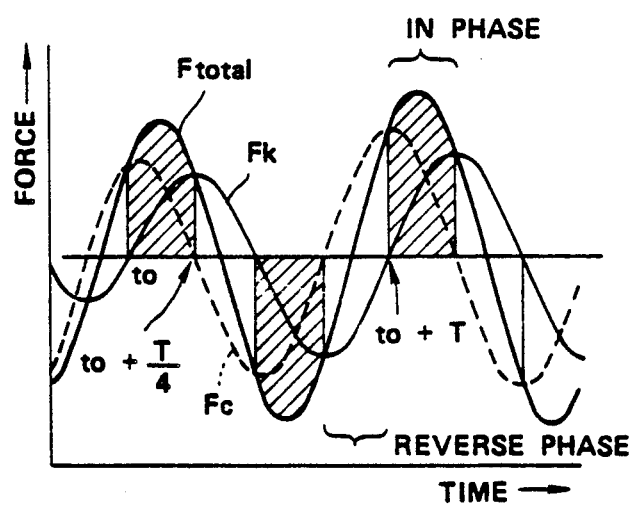
FIG. 2 is a chart showing in terms of force and time the phasing of the spring force Fk and the damping force Fc.

FIGS. 3 to 7 disclose an embodiment of the present invention. In shown in FIG. 4 the embodiment comprises an upper plate 101 which can be detachably connected a vibrating body such as an internal engine or the like, and a lower plate 103 which can be detachably connected to a base or body such as the chassis of an automotive vehicle 104. An essentially cylindrical hollow elastomeric body 104 is sealingly interconnected between the upper and lower plates 101 and 103. In this arrangement the upper plate 101 is arranged to close the upper end of the hollow formed in the elastomeric member 106 and define the top of a fluid chamber. A re-enforcing annular rib 108 is arranged about the external periphery of the elastomeric body 106 at a level approximately mid-way between the upper and lower ends thereof.

An annular spacer member 110 is sealingly disposed against a peripheral radial flange 103a of the lower plate 103. A cap member 112 is secured to the lower face of the spacer 110. This cap member 112 sealingly clamps a flexible diaphram 114 against the spacer in manner to define an air chamber 116 between it and the diaphragm. The diaphragm 114 in this position closes the lower end of the fluid chamber.

A orifice plate 118 is supported on the upper face of the lower plate 103 and arranged to divide the fluid chamber into a working chamber 120 and an expansion chamber 122. The orifice plate 118 is provided with a multi-channel orifice member 124. This member includes electrically isolated electodes which can be connected to positive and negative terminals of a voltage source and which define positive and negative electrodes. In this case the electrodes are formed of platinum or are platinum coated. As will be noted from FIG. 4 the electrodes in this instance take the form of a coaxial rod 124a and annular member 124b which is disposed coaxially thereabout.

An essentially annular vibratable mass 126 is supported by a diaphragm-like arrangement 128 the peripheral edge of which is sandwiched between the spacer 110 and the lower plate 103. The circular aperture 126a defined in the center of the mass member is sufficiently large as provide relatively free communication between the upper and lower faces of the same. To prevent contamination and the like the mass member 126 is completely enclosed by the diaphram like member 128.

The positive and negative electrodes are connected with the voltage source by way of lead lines which pass through the working chamber and which are sealingly clamped between the top of the cylindrical elastomeric member 106 and the upper plate 101.

It will be noted at this point that the invention is not limited to this connection arrangement and a number of changes in the electrode configuration and the lead line arrangement can be envisaged without departing from the spirit of the invention.

A voltage source 130 is operatively connected with a control circuit 132 in a manner wherein the output of the voltage source is controlled by the output signal of the control circuit.

The fluid chamber is filled with a fluid which exhibits rheopetic properties. Viz., the fluid in the fluid chamber is such as to exhibit an increase in viscosity when a voltage is applied thereto (Winslow effect).

Accordingly, with the above disclosed arrangement when a voltage is applied across the positive and negative electrodes which define the multi-channel orifice arrangement the fluid which is contained within the annular electrode member 124b is induced to undergo an increase in viscosity. This of course has a marked influence on the manner which fluid can be displaced between the working chamber 120 and the expansion chamber 122 and thus defines a variable damping control device.

The embodiment further includes first and second sensors (accelerometers) 134, 136 which are arranged to sense acceleration in a predetermined direction. In this instance the acceleration is that which occurs normally to the essentially parallel upper and lower plates. This acceleration component will be referred to as vertical acceleration hereinafter.

The first sensor 134 is disposed on the vibrating body (e.g. engine) while the second sensor 136 is disposed on the base or body (e.g. the vehicle chassis). The outputs of these sensors are applied to the control circuit 132. In this embodiment the control circuit includes a microprocessor which comprises a RAM, ROM, CPU and the like. An algorithm for processing the data input from the two sensors and for deciding the timing and level of the voltage to be applied to the positive and negative electrodes of the orifice, is included in the ROM of the device.

Figure 3:
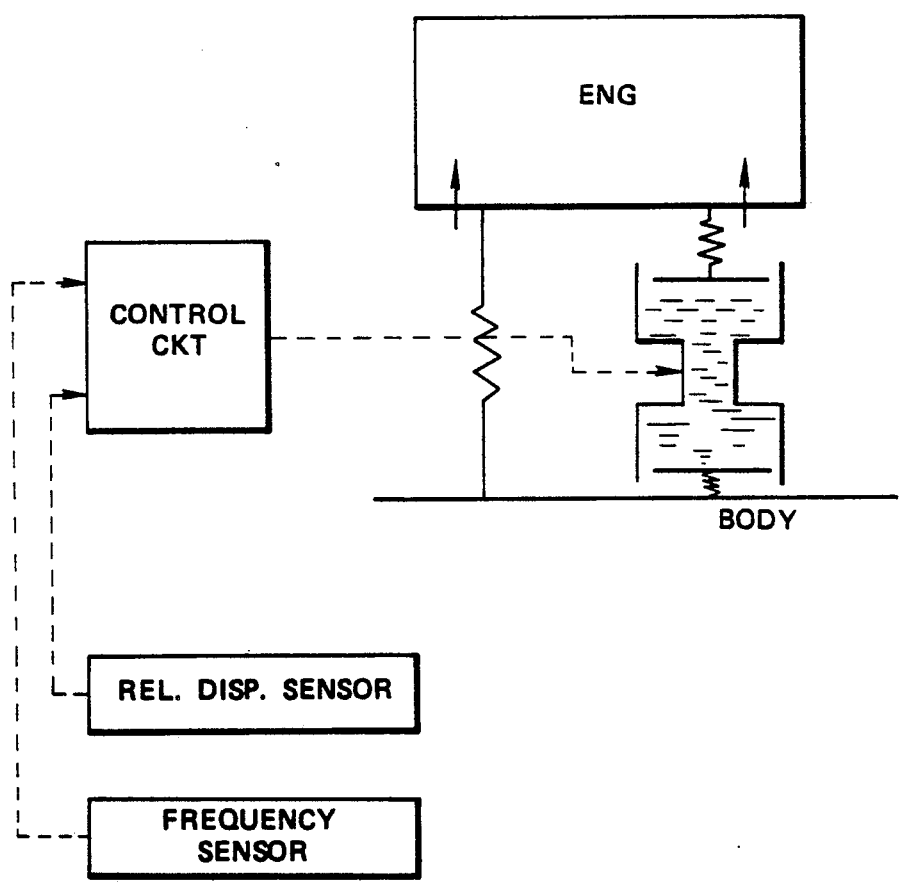
FIG. 3 is a schematic representation of the arrangement which characterizes an emodiment of the present invention.

The basic arrangement of the above disclosed arrangement is shown schematically in FIG. 3.

Figure 5:
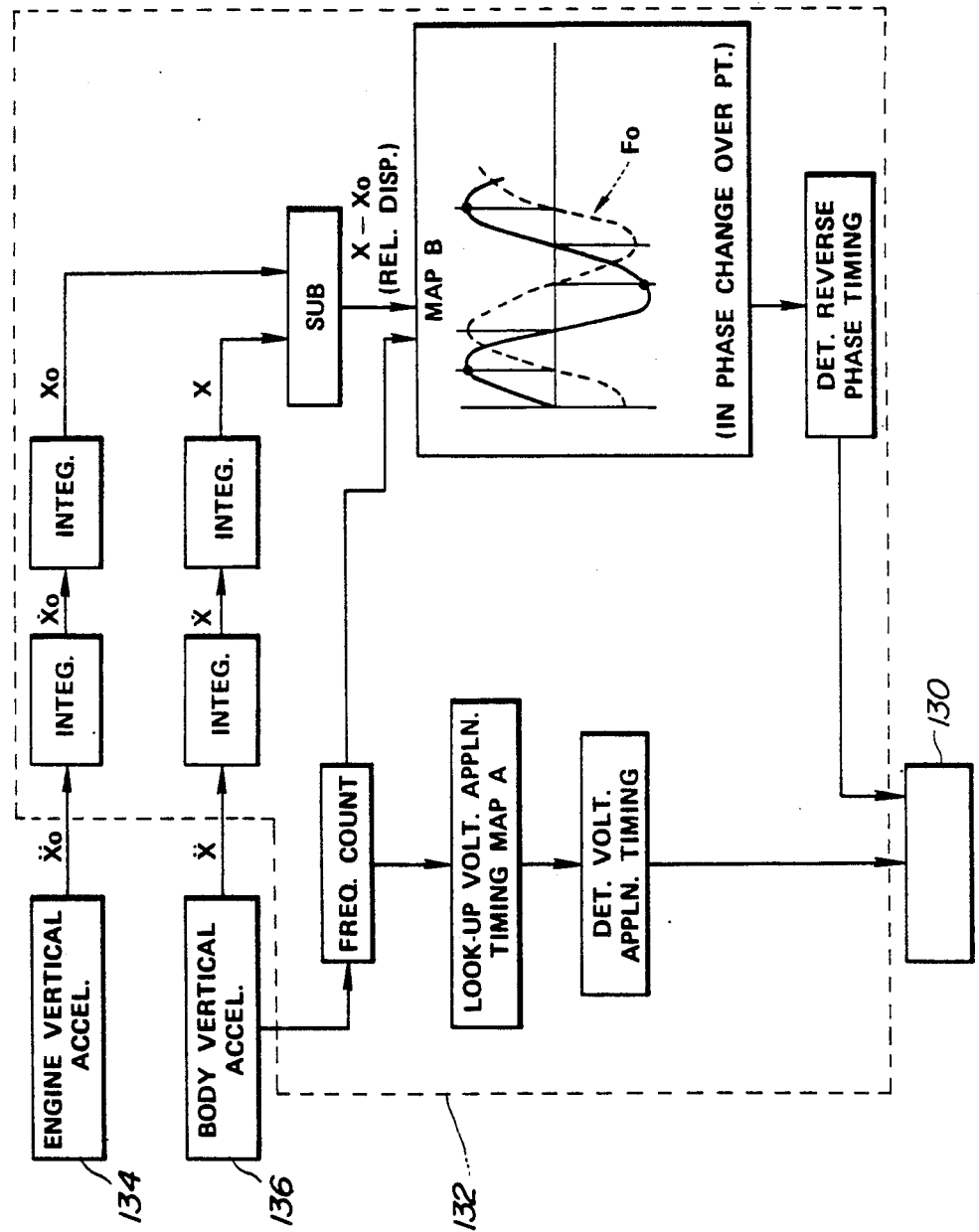
FIG. 5 is a flow chart-like diagram showing the steps which are executed by a algorithm which forms a vital part of the instant invention.

The operation of the instant embodiment is such that when the engine is operating the output of the first and second sensors 134, 136 is fed to the control circuit 132. The inputs are read and, as shown in FIG. 5, the signals indicative of acceleration are each subject to two sequential integrations.

The resulting signals are indicative of the displacement of the engine and the chasis. The two displacements are subtracted to obtain a relative displacement value. This value represents the power input from the elastomeric body and is indicative of the Fe component. shown in FIG. 6.

The output of the second sensor is also read in manner which enables the frequency of the vibration to be counted. The relative displacement and the frequency counts are used in connection with a look-up map (map B) in a manner which permits the timing of the reverse phase to be determined. Viz., the map is logged in terms of Fe and Fo and in a manner which enables the timing at which the Fo plot and the Fe plot are going in opposite directions (reverse phase) and proceeding in the same direction (in phase) to be obtained based on the knowledge of the Fe plot which is derived using the two previously mentioned values (the relative displacement value and the frequency count).

The frequency count is used alone to look-up the most appropriate voltage application timing from map A which is recoreded in terms of voltage application time and frequency.

Finally, the voltage application time and the timing of the reverse phase are used to induce the voltage source 132 to generate an ON-OFF type signal.

Figure 4:
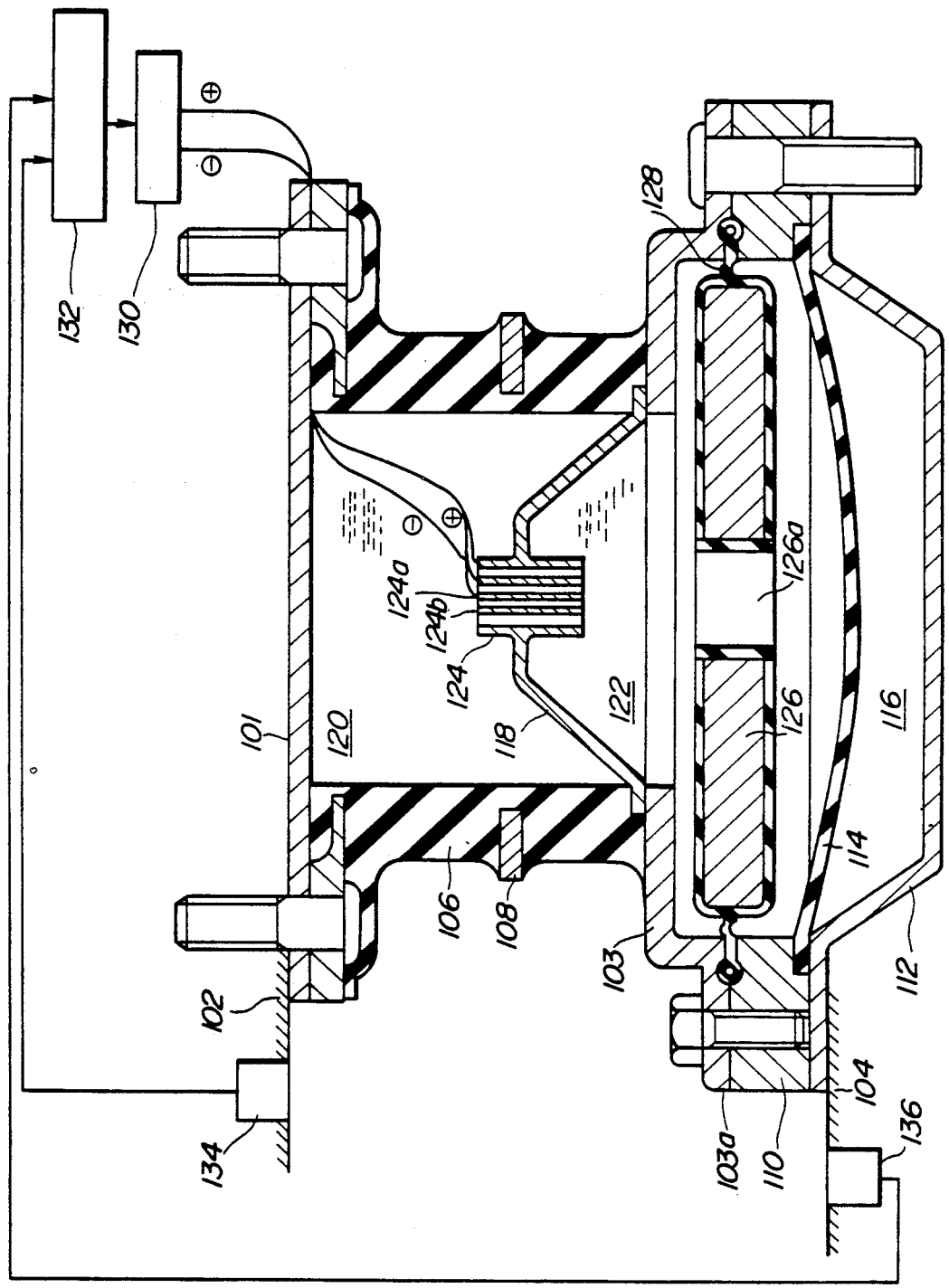
FIG. 4 is a sectional elevation showing the construction of the embodiment of the present invention.
Figure 6:
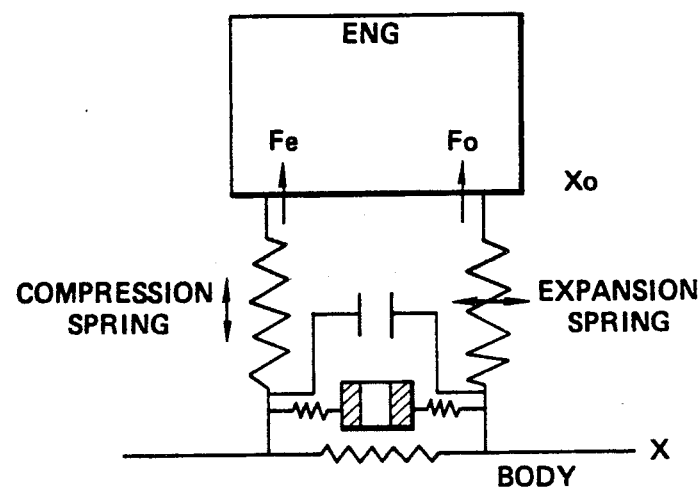
FIG. 6 is a model showing the arrangement of the embodiment of the instant invention.

At this point it should be noted that the arrangement shown in FIG. 4 can be depicted (as shown in FIG. 6) as a model which exhibits multiple degrees of freedom and which includes a dynamic damper mechanism.

Figure 7:
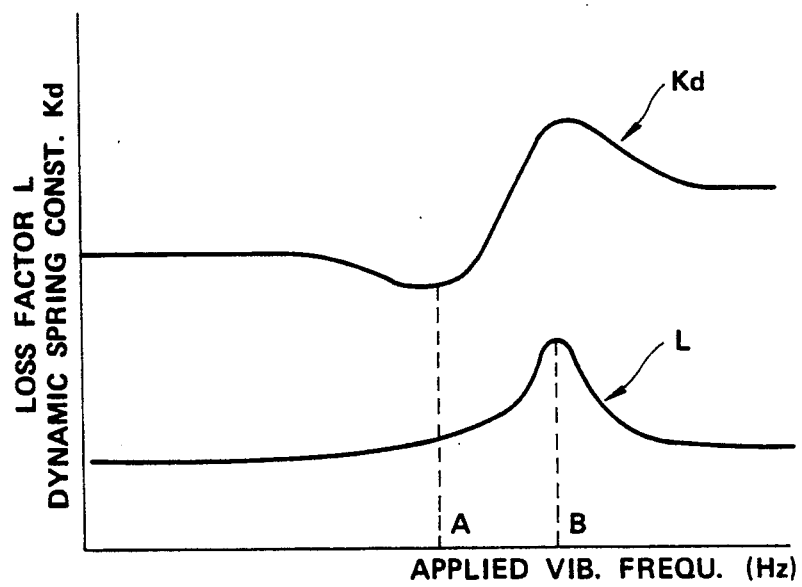
FIG. 7 is a graph showing in terms of applied frequency the changes in the dynamic spring constant Kd and the loss factor L which are produced in accordance with the instant invention.

In the disclosed arrangement the fluid contained in the electronically controlled orifice 124 acts as a mass while the flow of the fluid between the two chambers together with the expansive characteristics of the elastomeric members 106, 114 cooperate in a manner to define a spring. As shown in FIG. 7 the dynamic spring constant Kd characteristics are such as to be lower at resonance frequency A than at resonance frequency B and to exhibit a reduction at frequency A. On the other hand, the loss factor L characteristics are such as to exhibit a dynamic damping effect at resonance frequency B.

Accordingly, it will be understood that the vibration damping device or mounting device according to the present invention cannot be expressed as a model having only one degree of freedom.

Prior to resonance the phase difference between the vertical spring input power Fe and the expansion spring input power Fo is close to 0 degrees. That is to say, the phase difference is limited to deviating within a range of 0 to 180 degrees. In other words, under these conditions, the damping coefficient varies as a function of the changes in Fe and Fo between an inphase relationship and a reverse phase relationship.

During the inphase relationship Fe and Fo are such that the value of $|Ftotal| = |Fe + Fo|$ increases and the system assumes an undesired condition. That is to say, at this time the damping constant C is reduced and the fluid mass which is transferred through the orifice 124 is subject to ready movement.

On the other hand, when the inphase changes to the reverse phase $|Ftotal|$ reduces and during this period the damping coefficient C increases and the system assumes a condition wherein the energy damping effect takes place in a desired manner.

However, if we consider the previously mentioned phase difference problem and the effect of the expansive spring input power Fo produced by the orifice damping, the vertical spring input force Fe and the expansive spring input force Fo are such that during the reverse phase the effective increase in the orifice damping effect tends to be lost. In accordance with the present invention it is at this time that the control timing produced by the control algorithm takes effect.

That is to say, with the instant embodiment, during modes of operation wherein large amplitude low frequency vibration is produced (viz., during engine idling) no voltage is applied to the orifice electrodes 124a, 124b. Under these conditions the resonance frequency of the mass of fluid defined in the orifice 124 is tuned so that the dynamic spring constant Kd is minimized for a predetermined vibration frequency which is applied at that idling engine speed. That is to say, tuned in a manner to induce the resonance frequency to correspond to frequency A of FIG. 7.

With this arrangement during engine idling, the dynamic spring constant is minimized and is possible to attenuate vibration under such conditions.

When the engine is operated at normal rotational speeds, an extremely high voltage is applied to the orifice electrodes 124a, 124b (in an ON-OFF manner) and during the application of the voltage the fluid body defined therein tends to become almost solid. Accordingly, the orifice passage defined within the outer cylindrical electrode becomes blocked. With the orifice so restricted and with the resulting expansion spring value, the resonance frequency is tuned to a second predetermined value at which the lost factor L is maximized and which corresponds to the applied frequency produced by shaking of the engine. That is to say, at the engine speed at which engine shake is generated, the resonance is tuned to correspond to the frequency of the applied vibration which occurs at B of FIG. 7.

Therefore, during running of the engine the engine shake vibration is attenuated by the effect of the dynamic damper mechanism.

Further, the previously described algorithm provides ON-OFF control of the voltage which is applied to the orifice electrodes 124a, 124b and allows the expansion spring input power Fo to be selectively reduced in a manner which permits the force which is applied from the chassis to be reduced and effective damping of the engine vibration can be achieved.

During modes of operation when small amplitude high frequency vibration is produced, the vibratable mass 126 which is suspended by the diaphragm-like arrangement 128 and which defines the dynamic damper mass, can be tuned so that its resonance frequency is located in the range of 50-60 Hz (by way of example only). Under these circumstances, the power which is inputted from the engine and the vibration of the dynamic damper mass are such as to cancel each other and thus block the transmission of the vibration component having a frequency of 80 Hz and above and which tends to produce cabin reverberation noise.

Further, as the dynamic damper mass is provided with the central opening 17a the flow of fluid which passes through the orifice is not restricted and engine shake and cabin reverberation which tend occur at the same time can be effectively reduced due to the attenuation of a compounded vibration input containing 10 Hz and 80 Hz components.

The merits which are obtained with the instant embodiment are deemed to be that:

1. The reverse phase timing of the vertical spring input force Fe and the exapansive spring input force Fo can be calculated and this timing used in combination with the vibration frequency to establish a predetermined timing with which a voltage should be applied across the terminals 124a, 124b of the orifice and increase the orifice damping effect. This permits the expansive spring force produced during the reverse phase to be attenuated due to the effective reduction in dynamic spring constant and the establishement of a dynamic damper effect;

2. The dynamic damper mass 126 is suspended by an elastomeric diaphram like member which enables the resonance frequency of the arrangement to be tuned in a manner wherein cancellation of predetermined vibrations is possible; and 3. The dynamic damper mass is provided with a relatively large central opening 126a which permits engine shake and cabin reverberation noise to be simultaneously attenuated.

It will be of course noted that the instant invention is not limited to the construction disclosed in FIG. 4 and that the concept on which the instant invention is based can be applied to arrangements such as shock absorbers wherein the springs take the form of actual coil springs and the like and which shock absorbers are utilized in automotive suspensions and the like.

What is claimed is:

1. In a device which is interposed between a vibrating body and a base, means defining a spring, said spring being operatively interconnected between said body and said base, said spring undergoing distortion when said body moves relative to said base;

means defining first and second variable volume chambers, said first and second chambers being filled with a fluid which exhibits rheopectic properties, the chamber defining means being operatively connected between said body and said base in a manner wherein displacement of said body with respect to said base induces fluid to be displaced between said first and second chambers;

an orifice operatively interposed between said first and second fluid chambers;

first and second electrodes defined in said orifice, said first and second electrodes being arranged to define a multi-passage arrangement in said orifice in a manner wherein when a voltage is applied to said first and second electrodes, the viscosity of said rheopectic fluid between said electrodes increases and the restriction to fluid flow through said orifice increases;

means for detecting the relative displacement between said body and said base;

means for detecting the frequency of the vibration being applied to said device;

a control circuit which is responsive to said relative displacement detecting means and said frequency detecting means and which utilizes the detected relative displacement to develop a vertical spring input power value and which utilizes the detected relative displacement and the detected frequency to calculate an expansive spring input force value and the timing in which the phase of the vertical spring input force and the expansive spring input force are reversed, said control circuit being arranged to determine the timing with which a voltage should be applied to said first and second electrodes.

2. In a device which is interposed between a vibrating body and a base, means defining a spring, said spring being operatively interconnected between said body and said base, said spring undergoing distortion when said body moves relative to said base;

means defining first and second variable volume chambers, said first and second chambers being filled with a fluid which exhibits rheopectic properties, the chamber defining means being operatively connected between said body and said base in a manner wherein displacement of said body with respect to said base includes fluid to be displaced between said first and second chambers;

an orifice operatively interposed between said first and second chambers;

first and second electrodes defined in said orifice, said first and second electrodes being arranged to define a multi-passage arrangement in said orifice in a manner wherein when a voltage is applied to said first and second electrodes, the viscosity of said rheopectic fluid between said electrodes increases and the restriction to fluid flow through said orifice increases;

a first sensor, said first sensor being disposed in a manner to be responsive to a second parameter which varies with the vibration of said base;

a second sensor, said second sensor being disposed in a manner to be responsive to a second parameter which varies with the vibration of said base;

a control circuit operatively connected with said first and second sensors, said control circuit including:

means for processing the inputs from said first and second sensors and deriving the relative displacement between said body and said base and the frequency of the vibration which is applied to the device;

means for utilizing the derived relative displacement to develop a vertical spring input power value and, for utilizing the detected relative displacement and the detected frequency, for calculating an expansive spring input force value and the timing with the phase of the vertical spring input force value and the expansive spring input force value reverse; and means for determining the timing with which a voltage should be applied to said first and second electrodes.

3. A device as claimed in claim 2 wherein said first and second sensors comprise accelerometers and wherein said control circuit subjects the outputs of the two accelerometers to two sequential integrations and then subtracts the results to derive said relative displacement.

4. A device as claimed in claim 3 wherein said control circuit is responsive to the output of said second sensor in manner to develop a count which corresponds to the frequency of the vibration at the location of said second sensor and which further includes data which is recorded in a manner to define first and second maps, said second map being arranged to enable the timing wherein the phases said vertical spring input force and said expansive spring input force are reversed while said first map is arranged to enable the timing with which the voltage which is to be applied to said first and second electrodes to be ascertained based on the frequency count.

5. A device as claimed in claim 2 wherein said spring comprises an elastomeric body.

6. A device as claimed in claim 5 wherein said elastomeric body is hollow and is divided into said first and second variable volume chambers by a orifice plate, said orifice plate supporting said orifice.

7. A device as claimed in claim 6 wherein said first and second electrodes comprise a rod and a cylindrical member disposed coaxially thereabout, said rod and said cylinder defining said multi-passage arrangement.

8. A device as claimed in claim 2 further comprising:
a vibratable mass;
a springy member supporting said mass, said mass and said springy member defining a dynamic damping arrangement which can be excited to vibrate.

9. A device as claimed in claim 2 further comprising:
a vibratable mass;
means defining an aperture in said vibratable mass through which the rheopectic fluid can flow without restriction; and
a diaphragm-like member, said diaphragm like member suspending said vibratable mass in said second variable volume chamber in a manner said mass is totally immersed in the rheopectic fluid in said second variable volume chamber.

10. A device as claimed in claim 9 wherein said first variable volume chamber is closed by a rigid member while said second variable volume chamber is closed by a flexible diaphragm.

11. A vibration damping arrangement comprising:
means defining first and second chambers which are filled with an electrorheopectic fluid, said chamber defining means including:
a partition between said first and second chambers in which an orifice passage is defined, and
an elastomeric member, said elastomeric member acting as a spring and having first and second ends, said elastomeric member being constructed such that distortion thereof tends to change the volume of said first chamber, said chamber defining means having first and second connection structures, said first and second connection structures being connected to said first and second ends of said elastomeric body;
electrodes disposed in said orifice passage;
first and second accelerometers, disposed to detect the acceleration of said first and second connection members respectively and arranged to output first and second signals indicative of the detected acceleration;
means responsive to said first and second accelerometers for determining the relative displacement between said first and second connection members;
frequency determining means responsive to said first accelerometer for determining the frequency of the vibration of said first connection member; and
means for selectively applying a voltage to said electrodes, said voltage applying means being responsive to said relative displacement determining means and said frequency determining means for determining the timing with which the voltage is selectively applied to said electrodes.

12. In a method of controlling vibration between first and second bodies which are operatively interconnected by a damping device, said first body being subject to vibration, said damping device having first and second variable volume chambers which are filled with an electrorheoptic fluid and which are fluidly interconnected by an orifice passage, said orifice passage including electrodes on which a voltage can be impressed, the steps of:
sensing the acceleration of a first body;
sensing the acceleration of a second body;
determining the relative displacement between said first and second bodies based on the acceleration of said first and second bodies,
determining the frequency of a vibration which is transmitted from said first body to said second body based on the sensed acceleration of said first body;
determine the timing with which a voltage should be impressed on said electrodes using the relative displacement between said first and second bodies and the determined frequency.

* * * * *